US006971007B1

(12) United States Patent
Currans

(10) Patent No.: US 6,971,007 B1
(45) Date of Patent: Nov. 29, 2005

(54) ASSURED PRINTING OF DOCUMENTS OF VALUE

(75) Inventor: Kevin G. Currans, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 715 days.

(21) Appl. No.: 09/641,929

(22) Filed: Aug. 17, 2000

(51) Int. Cl.$^7$ ................................. H04L 9/00
(52) U.S. Cl. .............. 713/165; 713/150; 713/151; 713/161; 713/201; 380/51; 380/55; 380/285; 380/277; 705/60; 705/62; 705/52; 705/77; 358/1.11; 358/1.12; 358/1.13; 358/1.14; 358/1.15
(58) Field of Search ............................ 713/16.5, 150, 713/151, 161, 201; 380/51, 55, 243, 285, 380/277; 705/62, 77, 60, 52; 358/1.11–1.15

(56) References Cited

U.S. PATENT DOCUMENTS

| | | | | |
|---|---|---|---|---|
| 4,404,649 A | * | 9/1983 | Nunley et al. ............... 235/379 |
| 5,398,283 A | * | 3/1995 | Virga ............................ 380/243 |
| 5,432,618 A | | 7/1995 | Monnot et al. |
| 5,784,460 A | * | 7/1998 | Blumenthal et al. ........... 705/51 |
| 5,861,619 A | | 1/1999 | Horino et al. ............... 235/470 |
| 5,889,860 A | * | 3/1999 | Eller et al. ..................... 705/51 |
| 5,917,996 A | | 6/1999 | Thorpe ......................... 395/113 |
| 5,923,763 A | | 7/1999 | Walker et al. ................. 380/51 |
| 5,974,548 A | | 10/1999 | Adams ......................... 713/200 |
| 5,999,622 A | * | 12/1999 | Yasukawa et al. ............. 705/51 |
| 6,011,905 A | | 1/2000 | Huttenlocher et al. ....... 395/102 |
| 6,015,087 A | | 1/2000 | Seifert et al. ................ 235/379 |
| 6,041,316 A | * | 3/2000 | Allen ............................ 705/52 |
| 6,119,108 A | * | 9/2000 | Holmes et al. ............... 705/40 |
| 6,279,112 B1 | * | 8/2001 | O'Toole et al. ............. 713/201 |
| 6,363,357 B1 | * | 3/2002 | Rosenberg et al. ........... 705/26 |
| 6,373,587 B1 | * | 4/2002 | Sansone ..................... 358/1.15 |
| 6,378,070 B1 | * | 4/2002 | Chan et al. ................. 713/155 |
| 6,385,596 B1 | * | 5/2002 | Wiser et al. ................... 705/51 |
| 6,446,051 B1 | * | 9/2002 | Gupta .......................... 705/52 |
| 6,711,677 B1 | * | 3/2004 | Wiegley ...................... 713/151 |
| 2002/0019937 A1 | * | 2/2002 | Edstrom et al. ............ 713/168 |
| 2002/0048039 A1 | * | 4/2002 | Nishikawa ................. 358/1.15 |
| 2002/0071559 A1 | * | 6/2002 | Christensen et al. ........ 380/277 |

FOREIGN PATENT DOCUMENTS

| | | |
|---|---|---|
| EP | 0662486 A2 | 8/1995 |
| EP | 0929023 A1 | 7/1999 |
| WO | WO 98/33293 | 7/1998 |

\* cited by examiner

*Primary Examiner*—Ayaz Sheikh
*Assistant Examiner*—Shin-Hon Chen

(57) ABSTRACT

The transmission and reproduction of an original document transferred via a data network can be assured when the printing mechanism generates a unique serial number for the document being printed. The sender of the document is assured that the intended recipient received the document, paid for it, and was able to print it by receipt of the unique serial number and a request for an encryption key by which certain information in the document was encrypted.

10 Claims, 14 Drawing Sheets

| | |
|---|---|
| "REGISTERED PRINT" PRINTER | |
| COMMUNICATIONS BETWEEN PRINTER AND BROWSER | PRINTER SENDS STATUS BACK TO BROWSER PLUGGIN / HELPER APP ON DECRYPTING SESSION KEY SUCCESS AND PRINT JOB SUCCESS. EACH PACKET IS ENCRYPTED WITH VENDORS PUBLIC KEY. "PRINT JOB SUCCESS" INCLUDES A "QUALITY / QUANTITY" COUNT FROM "GUARANTEED PRINT" ABILITIES —246 |
| "USER BUY PRODUCT" CLIENT - BROWSER | EACH STATUS PACKET THE BROWSER RECEIVES FROM PRINTER STORED. EACH NEW PACKET OVERWRITES THE PREVIOUS. |
| NETWORK TRAFFIC BETWEEN CLIENT AND VENDOR | - - COMPLETE - - |
| VENDOR | |
| NETWORK TRAFFIC BETWEEN CREDIT HOLDER AND CLIENT | |
| NETWORK TRAFFIC BETWEEN CREDIT HOLDER AND VENDOR | |
| CREDIT HOLDER | |
| CA - CERTIFICATE AUTHORITY (E.G. GTE, VERISIGN) | |

Fig. 2M

ASSURED PRINTING OF DOCUMENTS OF VALUE

FIELD OF THE INVENTION

The present invention relates generally to secure document printing. In particular, the present invention relates to a method and apparatus for establishing that a document represented by a computer file that was sent via a data network, was paid for and successfully printed from a remote printing device.

RELATED APPLICATIONS

The present application is related to patent applications concurrently filed herewith, the respective teachings of which are incorporated by reference. These related applications are U.S. patent application Ser. No. 09/641,615 by Currans et al., titled "Method and Apparatus For Insuring Output Print Quality" (hereinafter "Guaranteed Print"), and Ser. No. 09/641,618 by Currans, entitled "Serialized Original Print" (hereinafter "Serialized Print"). As of the filing date of this application and these related applications, all rights, title and interests are commonly owned by the Hewlett Packard Company.

BACKGROUND OF THE INVENTION

The Internet, and in particular the World Wide Web, has enabled the instantaneous transfer of electronic files between computers that might be located anywhere in the world so long as the computers are coupled to the Internet. Because these files routinely represent documents, photographs, or perhaps bank account, credit card account numbers, all of which have economic value, the speed at which intellectual property and money can be transferred is now nearly instantaneous.

While the ease and speed with which documents and value can be transferred can be a boon to business it can also be a liability when the distribution of an electronic file needs to be controlled. By way of example, if a valuable work of art such as a photograph, is digitized (i.e. converted into an electronic file), uncontrolled reproduction and distribution of the electronic file that represents the art work will eventually render the work valueless. Electronically transferring files that have any sort of economic value is problematic because of the likelihood that economic value will be taken by those who are unscrupulous.

With the advent of electronic commerce, and the accompanying worldwide distribution of documents and other valuable information, a way of discerning that a document has been delivered to, and printed by, an intended recipient might prevent or reduce instances of fraud enabled by the ease with which electronic files can be reproduced and distributed.

SUMMARY OF THE INVENTION

The present invention provides a method and apparatus for controlling printing of a document delivered via a computer network. A first portion of a document is encrypted using at least a first encryption key, thereby creating a partially encrypted file. The partially encrypted file is transmitted via the computer network. A second portion of the transmitted partially encrypted file is printed and a t least a serialized print number is returned. In response, the first encryption key is received. The first portion of the partially encrypted file is then decrypted and printed.

BRIEF DESCRIPTION OF THE DRAWINGS

FIGS. 2A through 2M show a data flow diagram or transaction timeline representation of the commands and signals exchanged between the various computers, software and printers that implement the claimed process.

DETAILED DESCRIPTION OF THE PREFERRED EMBODIMENTS

Briefly stated, the present invention provides a method and apparatus for verifying that a document was printed from an electronic file that was transmitted to and printed from a remote print mechanism. The exemplary method disclosed herein enables a document or file distributor to control re-distribution by conclusively determining whether a document printed from a file was printed in whole or in part. In a preferred embodiment, the process includes the steps of encrypting a document and/or parts thereof that is to be transferred electronically, transmitting the encrypted document to an intended party via a data network, such as the Internet, partially decrypting the document using a first decryption key so as to enable the document to be verified that it was properly received, and printing part of the document up to a point at which a second decryption key is required.

If the document is successfully printed down to the point where a second encryption key is required, the recipient of the document returns to the sender, an indicia, such a serial number of the document, which has been physically printed on the document at the time, that the document had started to print successfully. Receipt of the partial-printing proof by the document sender triggers the transmission to the document recipient (i.e., the printer and not the user's browser), the second decryption key by which the remaining portion of the document can be decrypted and printed by the recipient (i.e., the printer and not the user's browser). Receipt of the indicia that the document was at least partially printed is created by the recipient's printer or print mechanism using a method disclosed and claimed in "Serialized Print".

Upon the document sender's receipt of the indicia that the document was at least partially printed, the document recipient will thereby have provided to the document sender, conclusive proof that the entire document was received successfully. By using the "Guaranteed Print" technology, the accuracy of the document that was printed can be determined and a numerical indicia of output print quality generated such that a document sender provided with the print quality indicia can know whether the document that was printed was in fact a reasonably facsimile of the document that was electronically sent. Using the indicia of printing that was received by the sender, as well as an objective indicia of the output print quality documents that are sent electronically but which do not reasonable resemble their original condition as sent by the sender can be selectively retransmitted by the document sender at the document sender's discretion.

Figure 1:
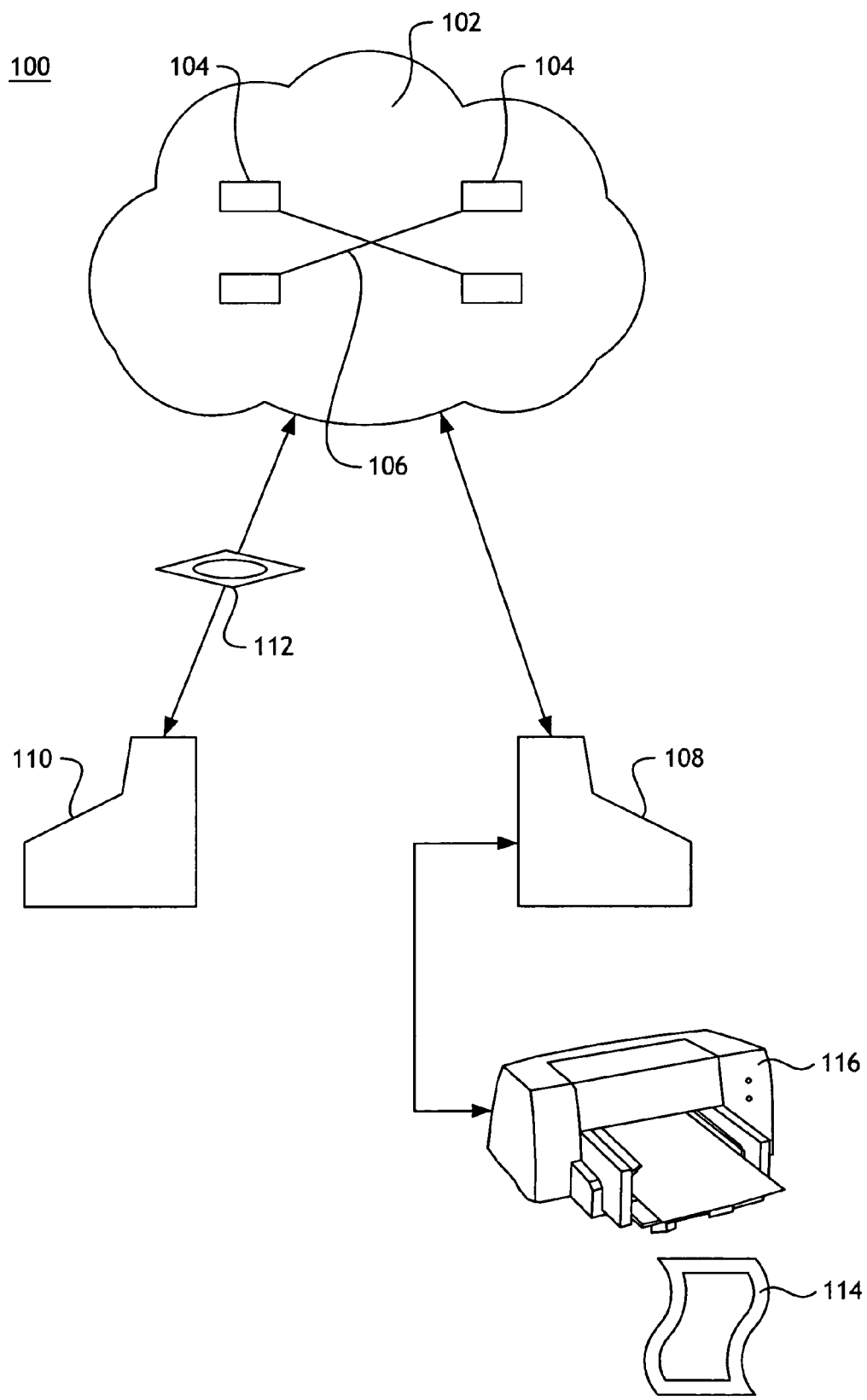
FIG. 1 is a simplified block diagram of a computer network including a sender's computer and a document recipient's computer and printer.

FIG. 1 shows a simplified block diagram of a registered printing system 100 by which computer files are electronically transferred over a network, to be printed at a remote device. The system 100 is comprised of a network, such as the Internet, which is a data network 102 comprised of a number of computers 104 intercoupled to each other via appropriate media 106 and switching systems (not shown). An explanation of computer networks is beyond the scope of this disclosure and not necessary for an appreciation of the invention disclosed herein. It is sufficient to state that electronic files are transferred between computers over the network. In addition to the Internet, other data transfer mechanisms such as Ethernet networks, local area networks, wide area networks or direct dial-up connections using one or modems (not shown) could be used to accomplish file transfers. The transferred files might represent a variety of documents, such as works of art, photographs, negotiable instruments, vouchers or other means of sending or receiving documents having economic value to either the sender or recipient. When such documents are printed, they typically have or represent economic value to the sender, the recipient, or a third party.

Document transfers between document senders and receivers are enabled by way of a network like the Internet but as set forth above, such transfers also might be accomplished using a local area network, a wide area network, an Ethernet network as well as the plain old telephone system sometimes referred to as the public switched telephone network. In instances where the data network 102 is the World Wide Web of the Internet, a web browser program executing on a subscribers computer 108 provides access to "web sites" that are embodied by other computers 104 coupled to the web, including the computer(s) of a document provider, identified in FIG. 1 by reference numeral 110.

By way of example, a subscriber's computer 108 might request the computer of a content provider 110 to transfer to it, some sort of electronic file 112, embodying a document that might include a work of art, a memorandum, or perhaps a negotiable instrument or airline tickets for example. Upon being printed, such a document has economic value to either the sender (not shown) or the recipient of the document (not shown).

Using the Internet 102, an intended recipient of a document, considered herein to be a document requester, can request from a sender's computer 110, the transmission of a file 112 from the sender's computer 110 via the Internet 102 to the recipient's computer 108. If the recipient's computer 108 has the requisite application program by which the transmitted file 112 can be opened and printed, printing the document 114 that was embodied as an electronic file 112 is readily accomplished using an appropriate printer 116 coupled to the recipient's computer 108.

In the preferred embodiment of this invention, the recipient's computer 108 and the printer 116 are equipped with, and capable of using, the method and apparatus disclosed in "Serialized Print." As such, the printer 116 is a printer that is capable of generating serialized output as described in "Serialized Print". The disclosure and teachings of the "Serialized Print," by which the generation of serialized output is taught, is incorporated herein by reference. Using that novel method for generating serialized printed output, the printer 116 generates a unique serial number, bar code or encoded data (hereafter, serial number) for the document 114 in the course of printing the file 112. The serial number generated by the printer 116 is of paramount importance in verifying to a document sender that the file 112 was received at the computer 108 and at least partially printed.

FIGS. 2A through 2M shows a data flow diagram depicting the steps of the method described herein.

Figure 2A:
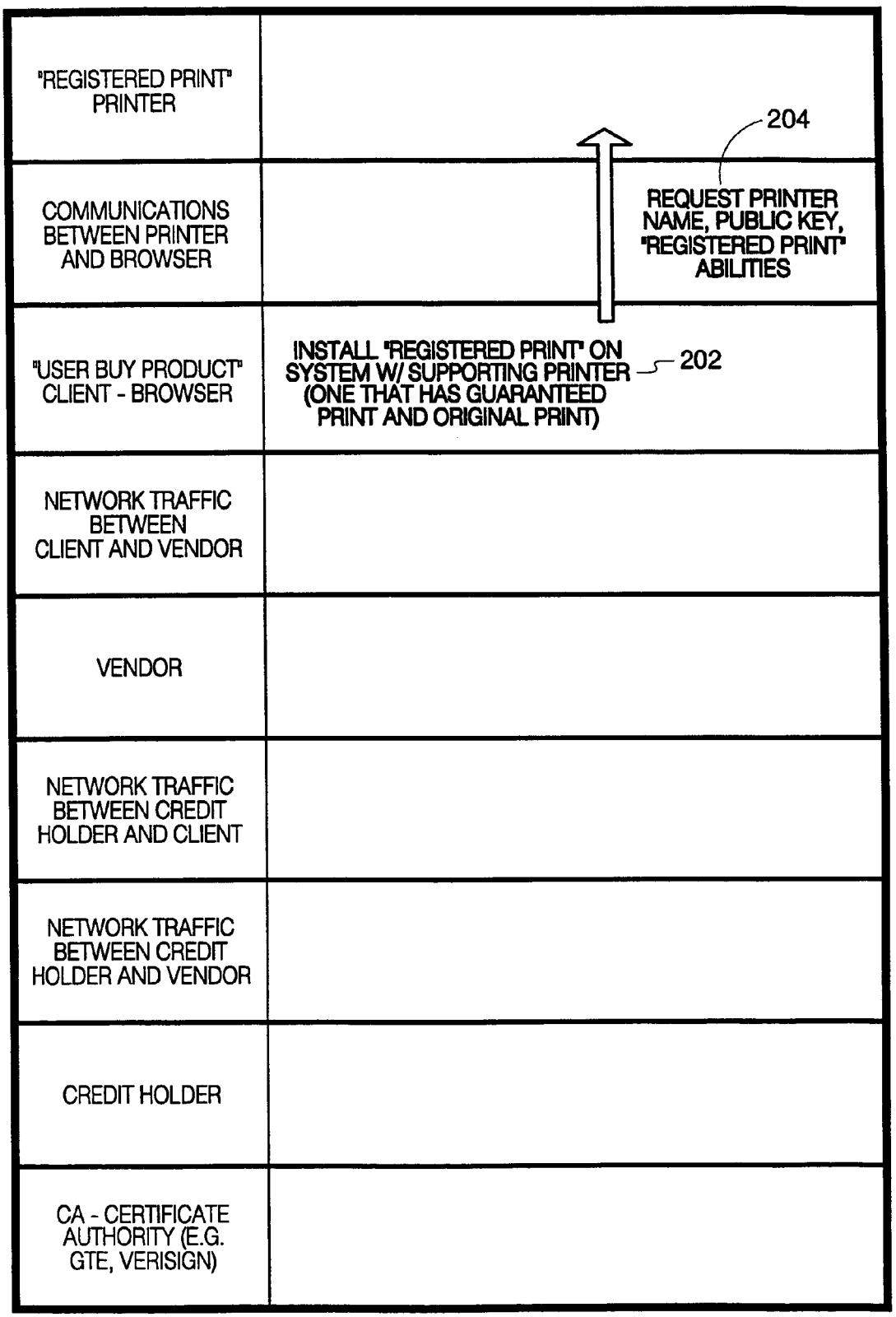

In FIG. 2A, as an initial matter, the software capability to guarantee output print quality and to produce a serialized original print needs to be installed on the recipient's computer 108 as well as on the sender's computer 110 as depicted in step no. 202. Assuming that such software capabilities have been installed on the respective first and second computers, the recipient's (i.e. second) computer 108 will request from the printer 116 an encryption key for public distribution (i.e. a public encryption key) in the format of an X.509 certificate, which might be embodied as a serial number, a model number or combination thereof obtained from the printer in step no. 204 in FIG. 2A.

Figure 2B:
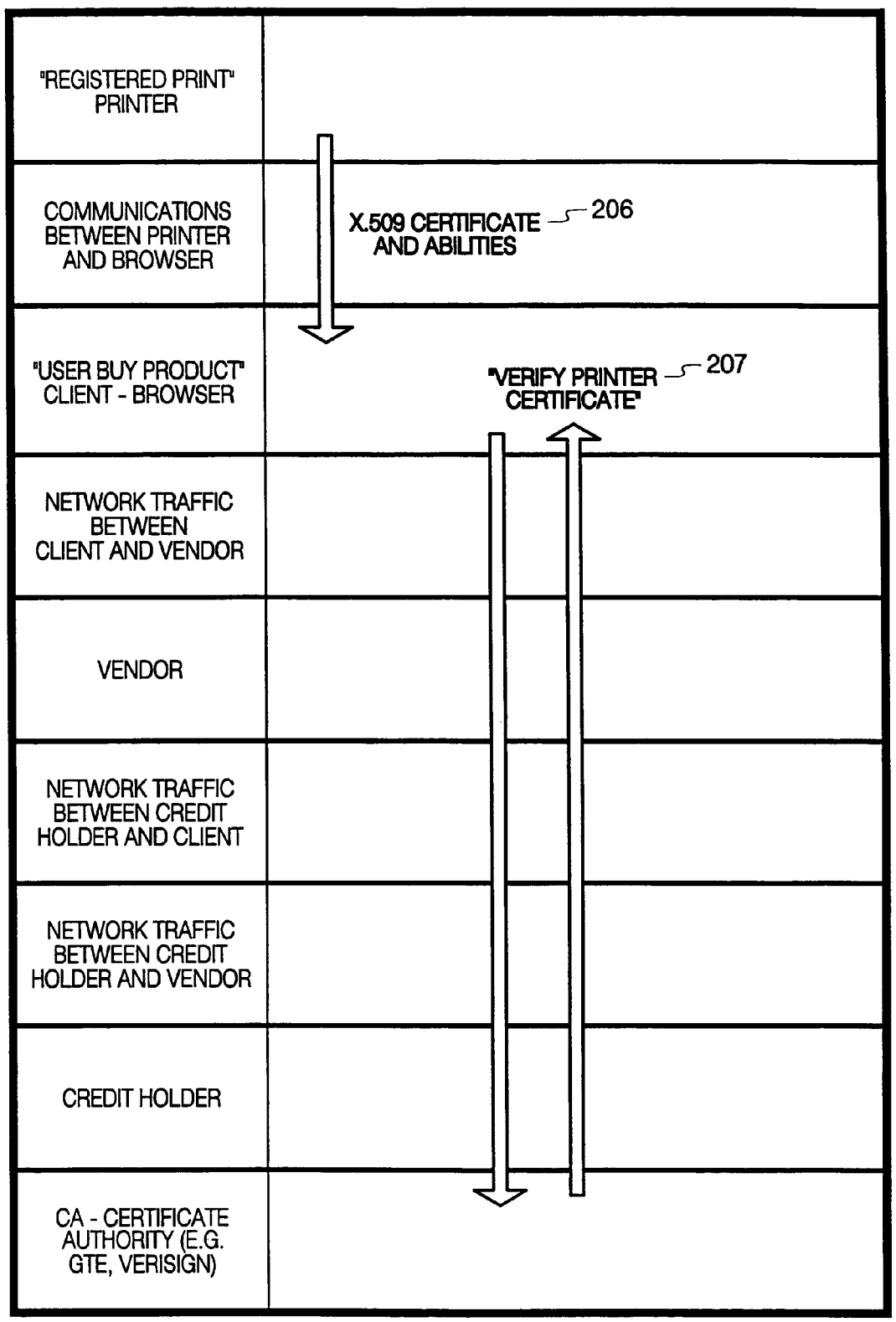

In FIG. 2B, when the printer returns an X.509 certificate and data as that identifies the capabilities of the printer (For example, is the printer capable of practicing the "Guaranteed Print" technology) at step 206, the user's computer installs the public key on a browser plug-in file, known to those skilled in the art.

Information about the X.509 standard is available from a variety of sources, including the National Institute of Standards and Technology web site, the URL of which is: http://csrc.ncsl.nist.gov/. An X.509 certificate serves as an electronic credential over the Internet for individuals and computer services (Web sites). X.509 certificates are used in the same way as birth certificates, passports or drivers' licenses to validate the identity of individuals for Web site access, communication and electronic commerce.

An individual wishing to send an encrypted message applies for a digital certificate from a Certificate Authority (CA). The CA issues an encrypted digital certificate containing the applicant's public key and a variety of other identification information. The CA makes its own public key readily available through print publicity or perhaps on the Internet.

The recipient of an encrypted message uses the CA's public key to decode the digital certificate attached to the message, verifies it as issued by the CA and then obtains the sender's public key and identification information held within the certificate. With this information, the recipient can send an encrypted reply. The most widely used standard for digital certificates is X.509 which is the technology used by this merchant.

The X.509 is currently believed to be the most widely used standard for defining digital certificates. The X.509 standard for digital certificates binds the identity of a person or organization to an electronic identification key. The digital certificate contains information about its owner, its issuer, issue and expiration date stamps, and information for verifying the integrity of the certificate that can be used for digital IDs, digital signatures and electronic fingerprints.

Figure 2C:
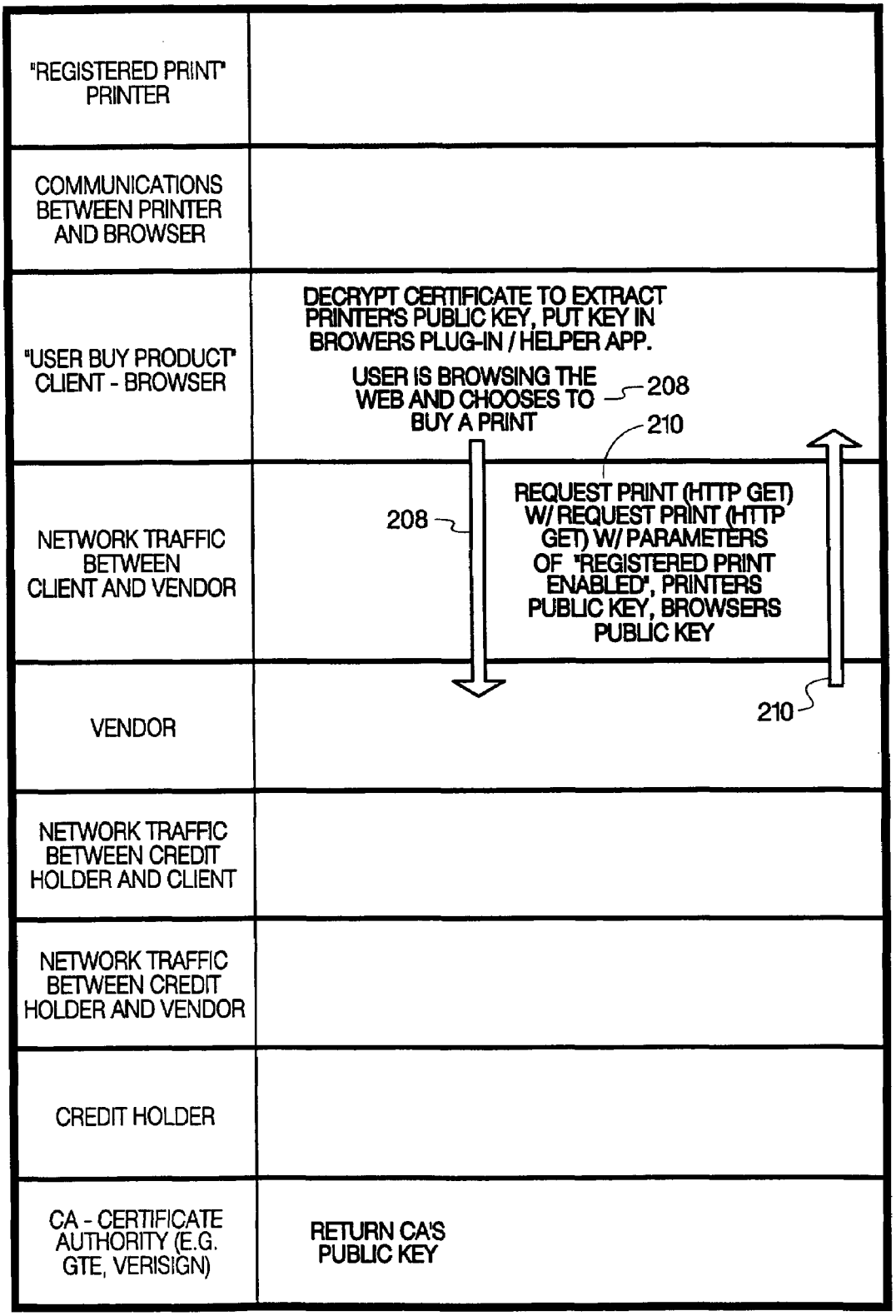

By executing an HTTP (hypertext transfer protocol) "GET" command, the user's web browser (e.g. Internet Explorer™ or Netscape™) running on the user's computer (i.e. the second computer) requests verification of the printer's public key from a security key issuer, which then posts the answer of authenticity of the printer's public key using a "PUT" in step 207. In FIG. 2C, in step 208, a "certificate" from a printer capable of practicing the "Guaranteed Print" technology is decrypted and the printer's public key is installed (or copied) into the document purchaser's web browser. A decision to buy a document is formatted and sent to the vendor 210 conveying the capabilities of the printer, i.e. that the printer is "Guaranteed Print" technology capable.

Figure 2D:
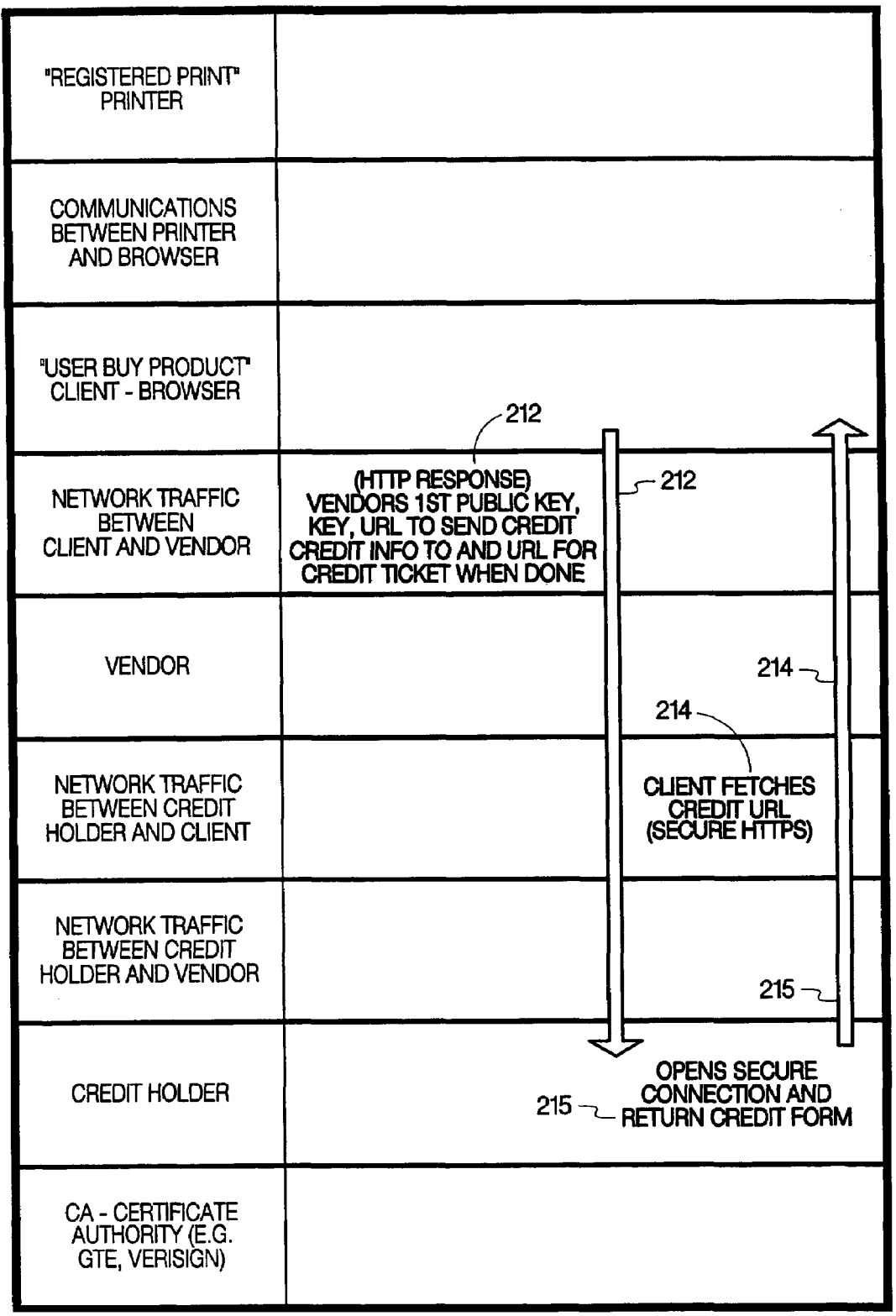
Figure 2E:
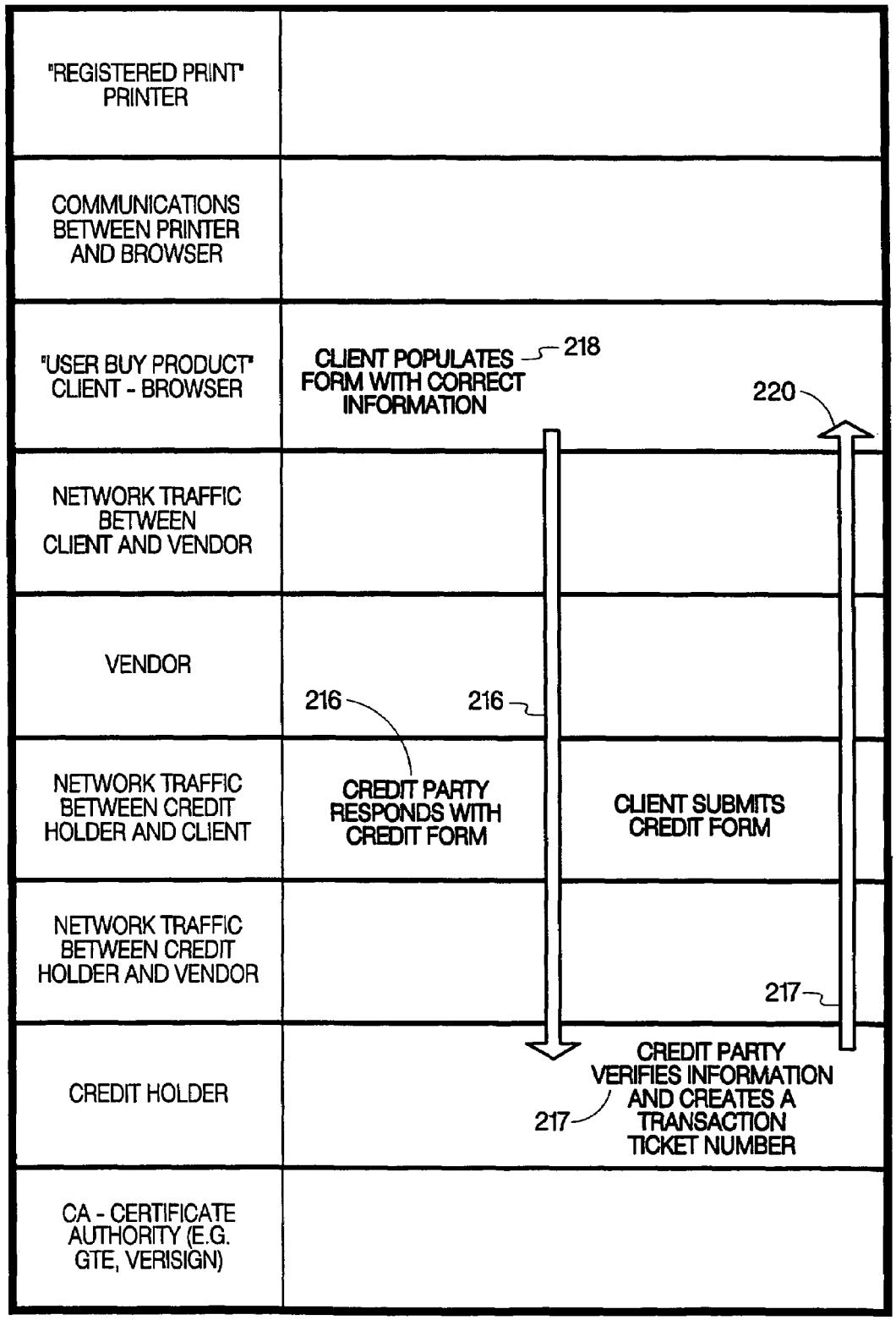
Figure 2F:
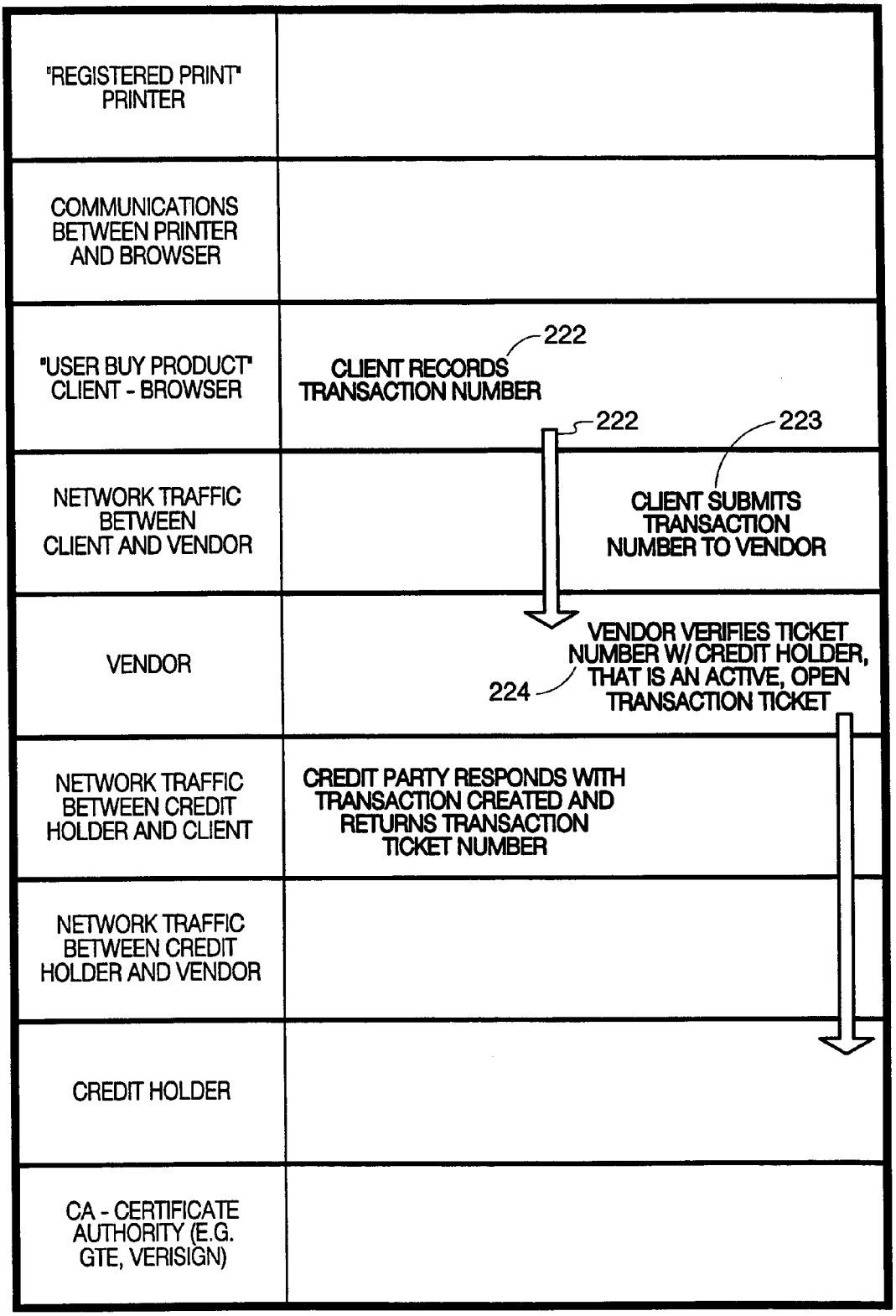

In FIG. 2D, the document vendor's computer's response 212 is to transmit a file (identified in FIG. 1 by reference numeral 112) at least part of which is encrypted at least once using a so called public key of the vendor's computer (identified in FIG. 1 by reference numeral 110) and preferably also encrypted using a uniform resource locator (URL) address to which credit or payment information is to be sent by the buyer.

In an alternate embodiment, only part of a document is encrypted prior to transmission and using only one key. By encrypting only part of a document (i.e. up to a predetermined point) prior to transmission, at least the unencrypted portion of the document can be printed at the destination, without a decryption key, thereby establishing recognition-of-value by the purchaser before transferring funds. In such an embodiment, a decryption key eventually needs to be provided. By holding back the decryption key pending receipt of payment—and perhaps ascertaining proof that at least part of the document was satisfactorily printed using for example the "Guaranteed Print" teachings—a document vendor can protect its interest in the document by withholding the key until payment has been received by an entity associated with the document, for example, the vendor or a credit agency for the vender.

In step 214, the document buyer's computer (i.e. the second computer 108) optionally retrieves the URL of a credit agency and performs a secure hypertext transfer protocol transfer providing payment information to a financial organization or other credit provider effectuating the transfer of funds for the payment of the file from the vendor. A credit approval transfer form 216 is optionally returned to the buyer and enables the buyer to populate the form with pertinent credit information by which the credit provider can make payment to the vendor in step 218, shown in FIG. 2E. If the credit transaction is validated by the credit provider as set forth in step 220, the transaction can be memorialized by the buyer's computer and thereafter forwarded to the vendor in step 222, shown in FIG. 2F.

Figure 2G:
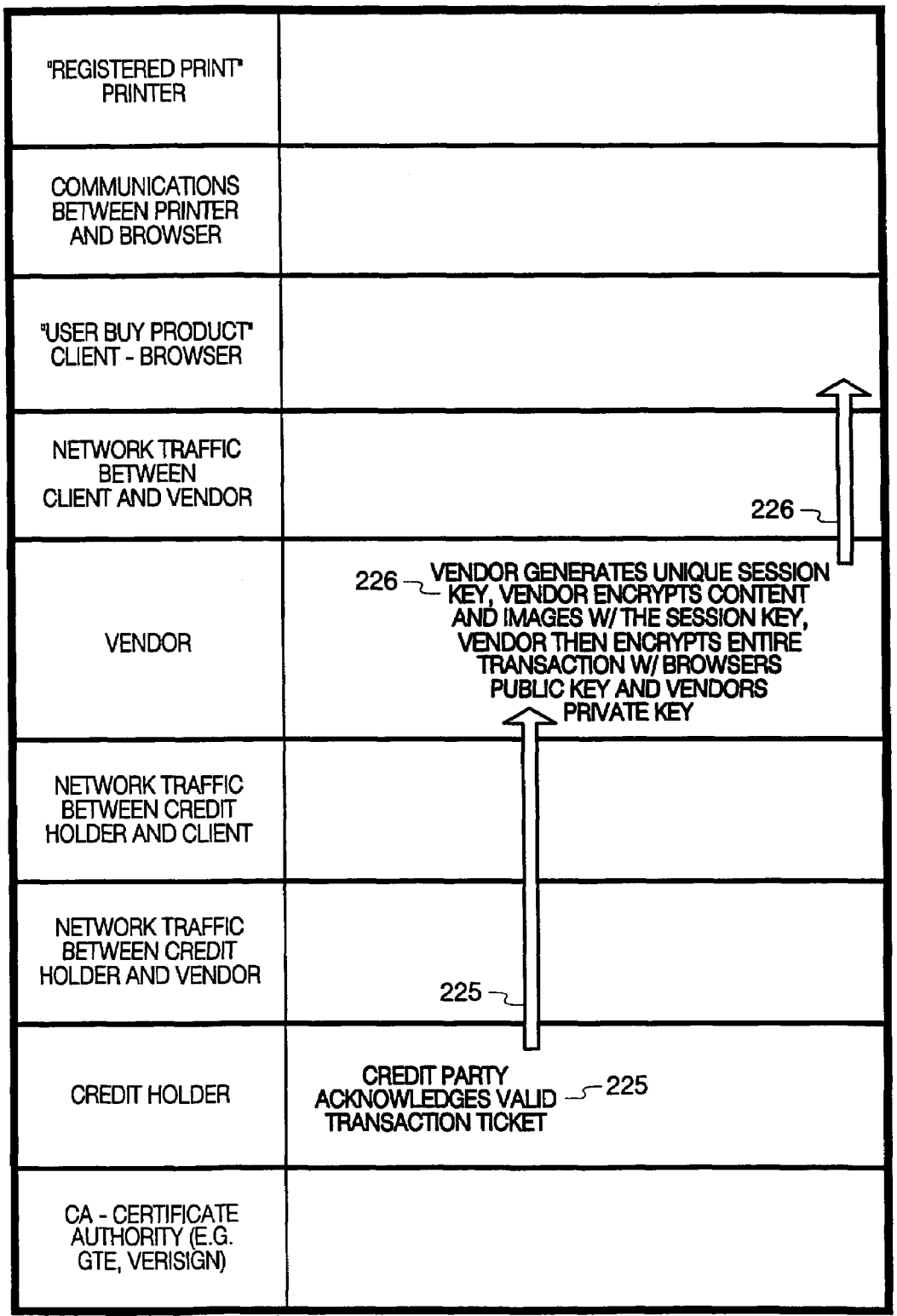

The document vendor can electronically verify with a credit provider, e.g. www.cybercash.com, in step 224 that the document purchaser has funded, or can otherwise pay for the transaction and, in response thereto, the credit provider can provide an appropriate acknowledgement 226 to the vendor, as shown in FIG. 2G. Upon verification that payment will be received by the document vendor, the vendor optionally encrypts the information content of interest, using the document vendor's private key and a second key (also known as a session key) and sends the doubly encrypted file to the purchaser in step 228. (Public key/private key encryption and decryption mechanisms are well known. Disclosure or understanding of that technology is not germane to the invention disclosed herein. Alternate embodiments of the invention include singly encrypting the file using a single encryption key, which as an example could be the document vendor's private key, a purchaser's public key or some other encryption key by which the document could be secured against theft in transit across a data network or by the document recipient.)

Figure 2H:
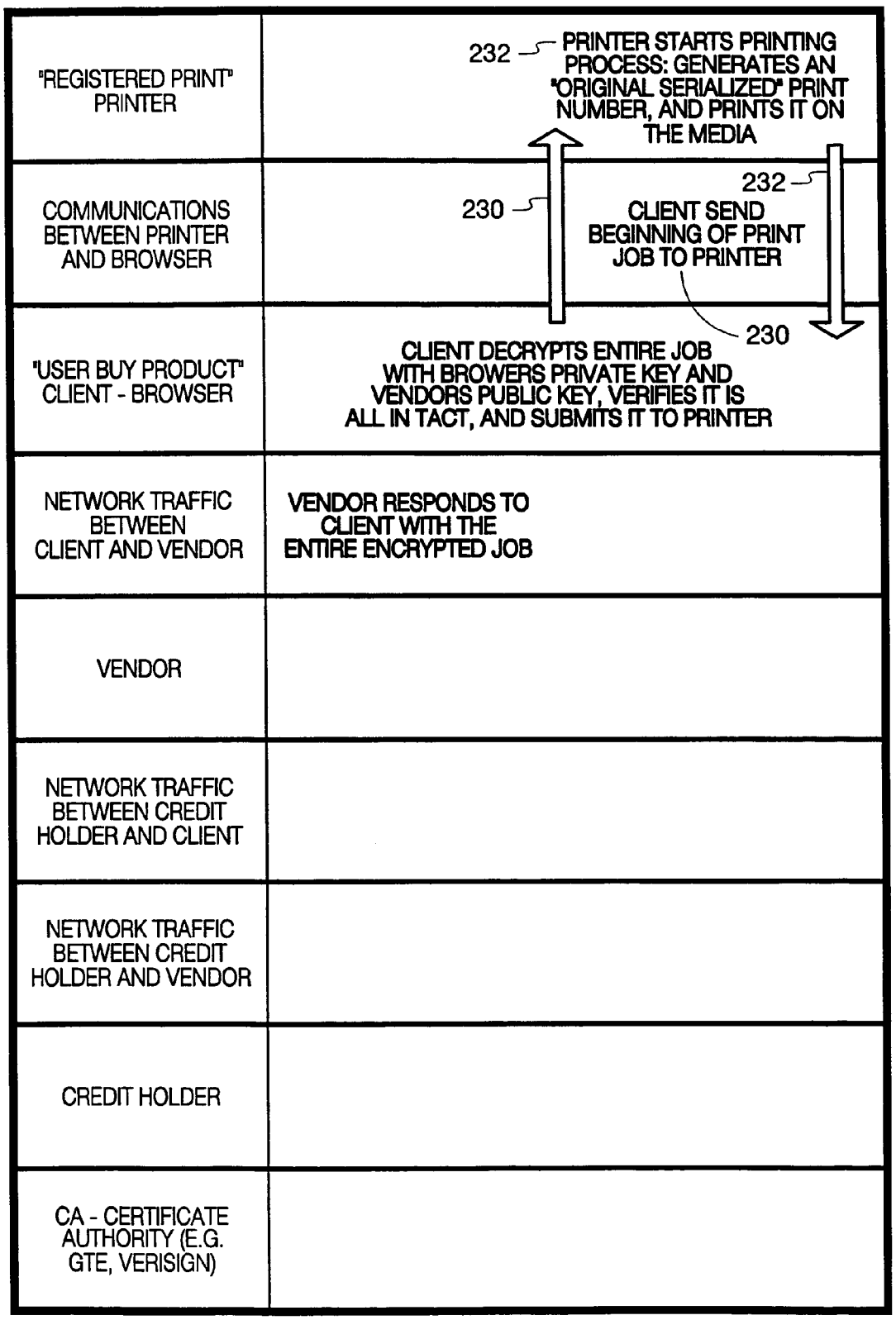
Figure 21:
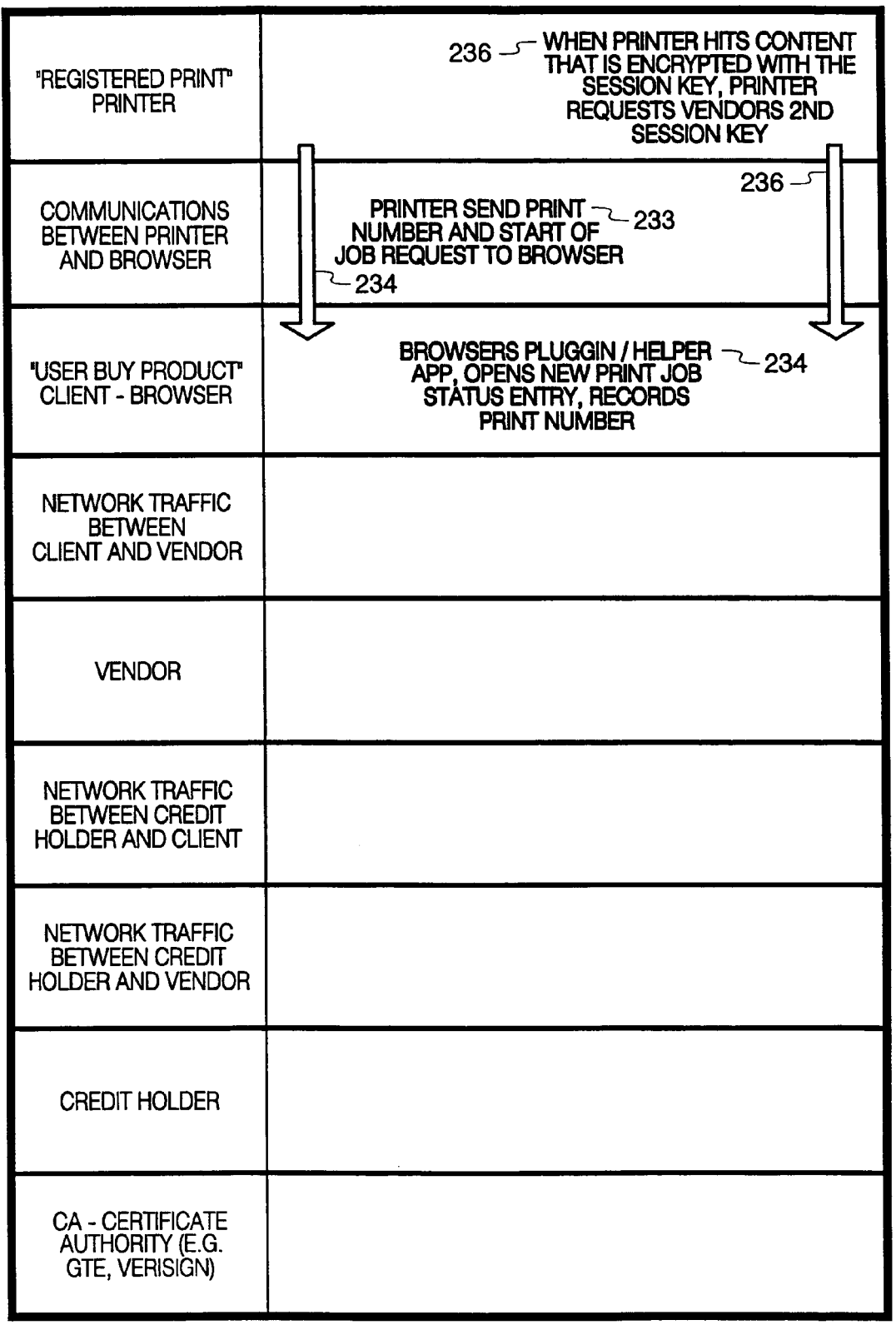
Figure 2J:
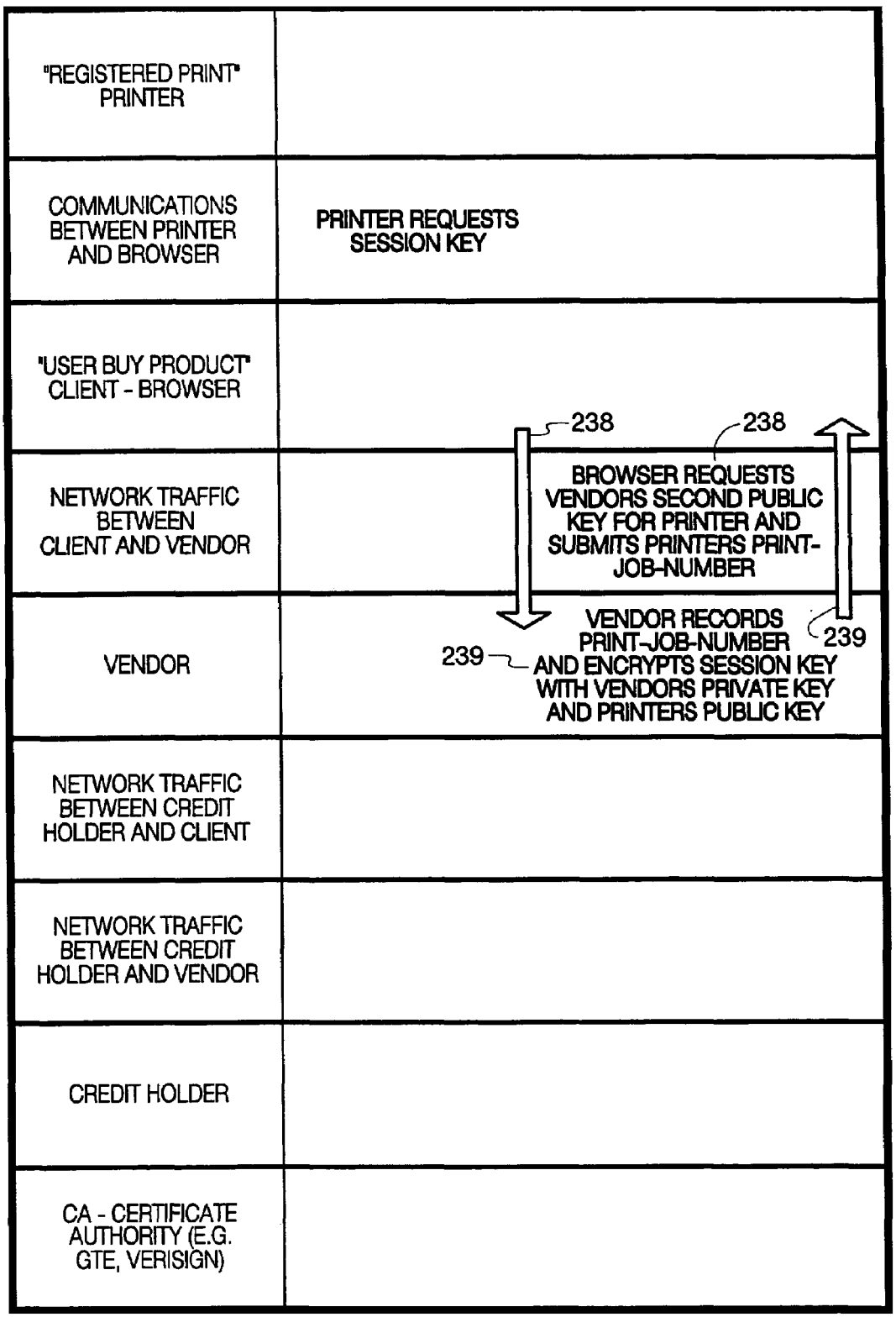

In FIG. 2H, using his own private decryption key, the purchaser decrypts the file and verifies that the received file is intact and sends the file to the printer 116 for printing in step 230. The printer begins printing the file and in the process generates an original serialized print number in accordance with the "Serialized Print" methodology, in step 232. The serial number generated by the printer will be printed and also sent to the browser of the purchaser's computer in step 234, shown in FIG. 2I. The browser also records the serial number of the print job in progress for subsequent use.

As the printer 116 continues following the instructions from the computer 108 to generate output, eventually the printer 116 or the computer 108 encounters information in the file 112 that is encrypted with the vendor's second key. Upon determining that further printing will be inhibited absent the other decryption key, the printer, using the "Serialized Print" methodology, requests the second key in step 236 from the user's computer, FIG. 2I. In step 238, FIG. 2J the user's browser transmits a request for the second key to the printer or in this case the vendor's computer 110 and as proof that the job has been at least partially printed includes the serialized print number generated by the printer in step 232.

Upon receipt of the original serial print number generated in step 232 by the vendor's computer 110 in step 238, the vendor can assume that at least part of the document file 112 was printed from the printer 116 and was fully and successfully received by the computer 108. The vendor can record the serialized print number in a database for billing purposes or for billing credit purposes.

Figure 2K:
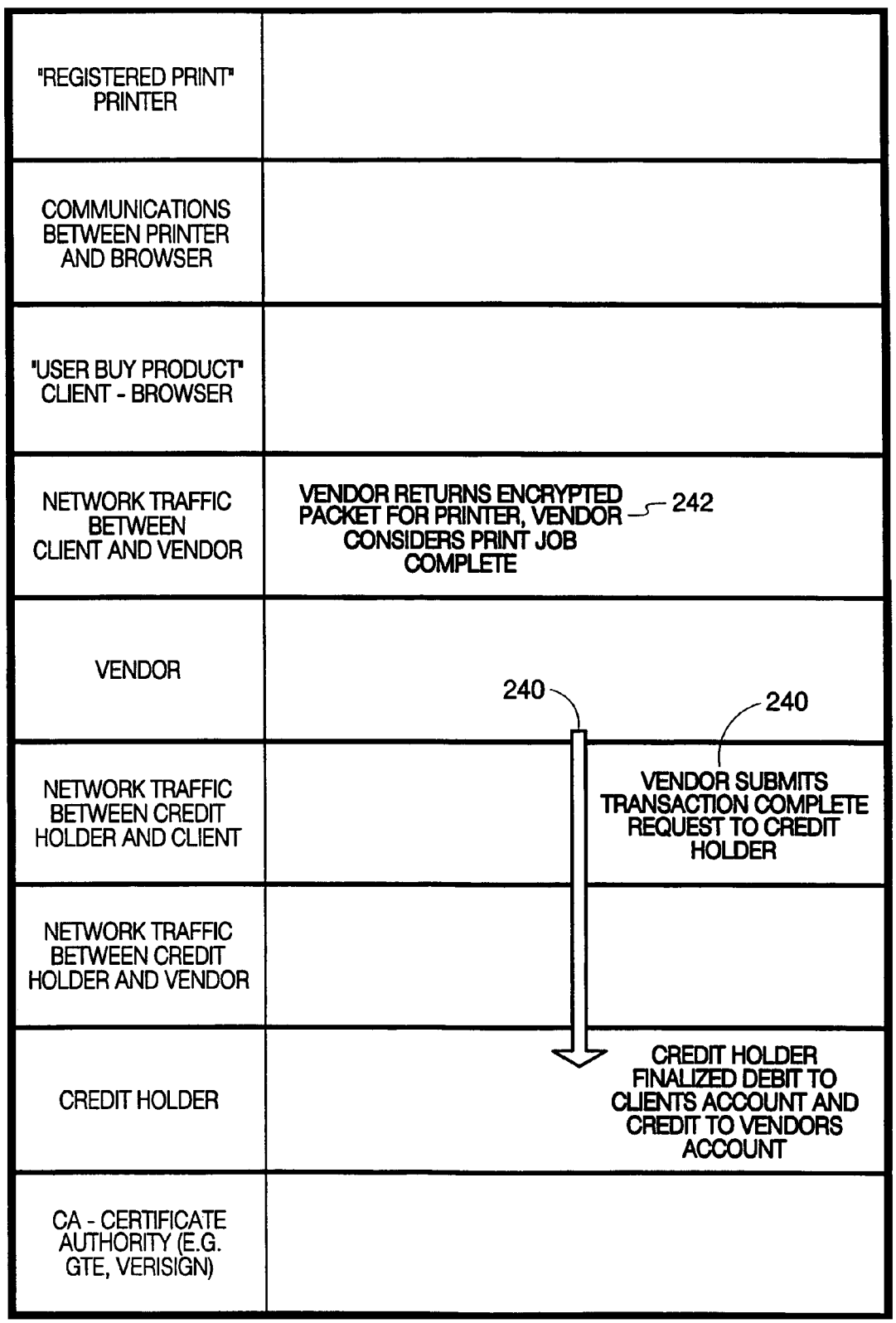
Figure 2L:
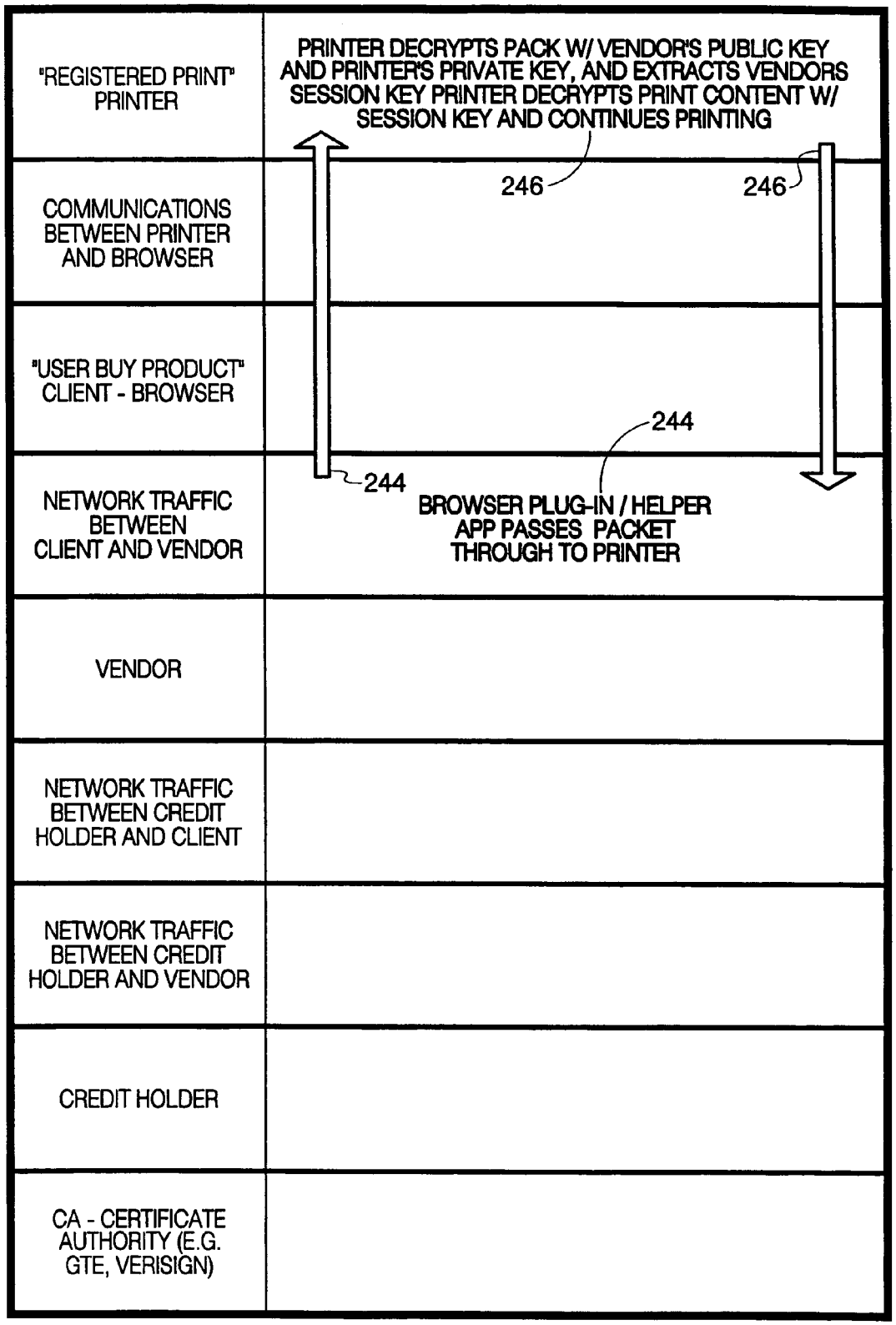

The vendor can also optionally submit the transaction complete signal in step 240, FIG. 2K, to the credit provider as a means for justifying the receipt of payment from the credit provider. Upon receipt that at least part of the document has been printed, the credit provider can debit the purchasers account and credit the vendor's account accordingly.

In order to complete the printing job, the vendor's computer 110 needs to return to the purchaser's computer 108, the second decryption key in step 242 or a session key, that the printer can use for decrypting the content The second key is encrypted so only the printer can decrypt it. This is generally done using the printer's public key and the vendor's private key. Upon receipt of the second key, the browser running on the purchaser's computer 108 passes the second encryption key to the printer in step 244, which enables the printer to decrypt the key and finish the print job it started in step 230 by decrypting the document and printing it. In step 246, the printer sends status information back to the browser of the purchaser's computer 108 informing the purchaser's computer 108 and possibly the browser of whether or not the entire print job was successful.

By using the methodology disclosed in the inventor's "Guaranteed Print" technology, the printer 116 can provide an objective measurement of the output print quality. A printer employing the "Guaranteed Print" technology is referred to herein as a printer that is capable of guaranteeing output print quality.

Using the "Guaranteed Print" technology, the printer 116 depicted in FIG. 1 can, in real time, compare what was printed to what was sent 112 and determine whether or not the purchaser got what he or she bargained for. Using that technology it is possible to create a numeric index of the relative output quality of a print job from a printer.

If output print quality was determined to be unsatisfactory or failed altogether, the printer 116 can send an appropriate error message to the vendor or the vendor's computer 110 informing the vendor that the output print quality was defective. In the event that an output print job did not successfully complete in its entirety, or was otherwise disturbed or defective, the vendor can impede retransmission of the file 112 until it physically receives all of the output that was printed by the printer 116.

By way of data recovered using the method and apparatus for insuring output print quality, the vendor knows precisely how much of the document file 112 was actually printed 114 and refuse to provide another copy of the document until physical receipt of the output print material is received in hand that has the serial number, bar code or encoded data in step 234.

Public and private encryption key technologies are well known to those skilled in the art. Alternative embodiments of the invention would include using proprietary keys of both the purchaser and the vendor. By using a publicly available key however, it is possible for the document sender to encrypt a file with a public key enables the document recipient to decrypt it using his private key. Commercially available public/private encryption software is readily available.

It should be apparent that by using the methodologies disclosed herein, that valuable documents can be transferred via data networks with some sense of security and with some sense that unauthorized reproduction of a document will be impeded. Similarly, valuable content for which value was received need not be retransmitted absent proof by the sender that the intended output was not successfully realized.

I claim:

1. A method to control printing of a document file delivered via a computer network comprising the steps of:
   at a first computer:
      encrypting at least a first portion of a document file using at least a first encryption key for creating a partially encrypted file;
      transmitting the partially encrypted file to a second computer via said computer network;
   at said second computer:
      printing at least a second portion of said partially encrypted file using a serialized print methodology that includes having the printer generate a unique serialized print number for the document file in the course of printing the document file;
      returning to said first computer at least the serialized print number, and receiving, in response thereto, said first encryption key;
      decrypting at the printer said first portion of said partially encrypted file to create a partially decrypted document file; and
      printing at least a portion of said partially decrypted document file using a guaranteed print methodology that includes sending the first computer information about the number of printed pages and output print quality of the document file.

2. A method in accordance with the method of claim 1 wherein said step of returning further comprises the step of providing payment.

3. A method in accordance with the method of claim 1 further including steps of:
   before transmitting the partially encrypted file to a second computer, encrypting at least part of said partially encrypted file to form a twice-encrypted file using a second encryption key; and
   prior to printing at least a second portion of said partially decrypted file, decrypting said twice-encrypted file using at least one of either said second encryption key or a third encryption key.

4. A method in accordance with the method of claim 1 wherein said serialized print methodology includes the steps of:
   generating by a device printing said decrypted document file, a number correlating said decrypted document file to said printing device;
   returning said number to said first computer for enabling said second computer to receive said first key.

5. A method for controlling the printing of a document delivered via a computer network comprising the steps of:
   printing a first portion of the document with a remote printer, said first portion being unencrypted;
   using a serialized print methodology that include having the printer generate a unique serialized print number correlating said document file to the printer in the course of printing the document file;
   communicating said generated number, via the computer network, with an entity associated with the document to arrange for the printing of a remaining portion of the document;
   receiving, as a result of said communicating step, an encrypted remaining portion of the document;
   using the printer to decrypt said remaining portion; and
   printing said decrypted remaining portion using a guaranteed print methodology that includes sending information about the number of printed pages and output print quality of the document file.

6. A method in accordance with the method of claim 5 wherein said communicating step further comprises the step of providing payment to said entity.

7. A method in accordance with the method of claim 5 wherein said communicating step further comprises the step of ascertaining quality of said printed first portion.

8. A method for controlling the printing of a partially encrypted document file delivered via a computer network, at least a first portion of which partially encrypted document is encrypted using at least a first encryption key, comprising the steps of:
   encrypting at least part of the partially encrypted document file to form a twice-encrypted file using a second encryption key;
   prior to printing at least a second portion of said partially encrypted document file, decrypting said twice-encrypted file using at least said second encryption key;
   printing using a printer at least a second portion of the partially encrypted document file;
   creating a serialized print number that includes having the printer generate a unique serialized print number for the document file in the course of printing the document file and returning the serialized print number via the computer network;
   receiving the first encryption key;
   using the printer to decrypt the first portion to create a decrypted document file; and
   printing said decrypted document file using a guaranteed print methodology that includes sending the first computer information about the number of printed pages and output print quality of the document file.

9. A method in accordance with the method of claim 8 further comprising the step of providing payment for the partially encrypted document.

10. A method in accordance with the method of claim 9 wherein said step of creating a serialized print number further comprises the step of generating, by a device printing said decrypted document file, a number correlating said decrypted document file to said printing device.

* * * * *